United States Patent
Amekawa

(12) 
(10) Patent No.: US 6,174,954 B1
(45) Date of Patent: Jan. 16, 2001

(54) RESIN COMPOSITION, ARTIFICIAL MARBLE OBTAINED BY MOLDING COMPOSITION AND PRODUCTION THEREOF

(75) Inventor: Yoshihide Amekawa, Niihama (JP)

(73) Assignee: Sumitomo Chemical Company, Limited, Osaka (JP)

( * ) Notice: Under 35 U.S.C. 154(b), the term of this patent shall be extended for 0 days.

(21) Appl. No.: 09/085,008

(22) Filed: May 28, 1998

(51) Int. Cl.[7] .................................................... C08K 5/09
(52) U.S. Cl. ..................... 524/533; 524/534; 524/458; 524/460; 524/710; 524/786; 264/77
(58) Field of Search ................................ 524/458, 460, 524/710, 786, 533, 534; 264/77

(56) References Cited

U.S. PATENT DOCUMENTS

| | | | | |
|---|---|---|---|---|
| 4,233,198 | * | 11/1980 | Nolken | 260/29.6 |
| 4,678,819 | * | 7/1987 | Sasaki et al. | 523/171 |
| 5,202,361 | * | 4/1993 | Zimmerman et al. | 522/120 |
| 5,847,036 | * | 12/1998 | Takabatake et al. | 524/321 |

FOREIGN PATENT DOCUMENTS

| | | |
|---|---|---|
| 513899B | 2/1993 | (JP) . |
| 532720A | 2/1993 | (JP) . |
| 6313019A | 11/1994 | (JP) . |
| 7188505A | 7/1995 | (JP) . |

* cited by examiner

*Primary Examiner*—Janet Baxter
*Assistant Examiner*—Barbara Gilmore
(74) *Attorney, Agent, or Firm*—Birch, Stewart, Kolasch & Birch, LLP

(57) ABSTRACT

A resin composition, comprising the components of:

(a) 10 to 40% by weight of (i) an unsaturated monomer having at least two double bonds which can effect radical polymerization or (ii) a mixture of said unsaturated monomer and an unsaturated monomer copolymerizable with said unsaturated monomer, (b) 50 to 85% by weight of an inorganic filler, (c) 1 to 20% by weight of a cross-linked resin particle, (d) 0.1 to 20% by weight of a resin having a methyl methacrylate unit, and (e) 0.01 to 5% by weight of a radical polymerization initiator, is provided. The resin composition has excellent handling property, generates little odor, and can be easily molded to obtain artificial marble.

16 Claims, No Drawings

RESIN COMPOSITION, ARTIFICIAL MARBLE OBTAINED BY MOLDING COMPOSITION AND PRODUCTION THEREOF

FIELD OF THE INVENTION

The present invention relates to a resin composition suitable for producing artificial marble excellent in moldability and heat resistance, and artificial marble obtained by molding the resin composition.

BACKGROUND OF THE INVENTION

A conventional hand lay up molding method and a spray up molding method have been substituted by a method in which a sheet molding compound (SMC) material or bulk molding compound (BMC) material respectively containing as a main component an unsaturated polyester resin is used since the molding work of this method is simple, and these materials such as SMC and BMC have been used for a bath tub and the like.

However, these materials containing as a main component an unsaturated polyester resin exhibit a problem in that they were inferior with regard to hot water resistance and durability since the materials hydrolyzed under alkaline condition.

In order to improve this problem, various methods were suggested.

For example, Japanese Patent Application Publication (JP-B) No. 5-13899 discloses a method for producing a natural grain-like article wherein (i) 100 parts by weight of a "monomer A" containing 20% by weight or more of a polyfunctional (meth)acrylate, (ii) 50 to 300 parts by weight of a "methacryl-based resin powder B" having a grit of 20 mesh or less and an average molecular weight of 50,000 to 200,000 and being derived from a monomer containing methyacrylates as an essential component, (iii) 0.5 to 2 parts by weight of a "curing agent C" for the monomer A, (iv) 100 to 500 parts by weight of an "inorganic filler D", and optionally, (v) a coupling agent, a coloring agent and a reinforcing agent are mixed, kneaded and aged with heating at room temperature or at a temperature lower than the curing temperature to obtain a molding material which is in clay form or solid form at room temperature. The produced molding material is molded and cured under pressure with heating.

Japanese Patent Application Laid-Open (JP-A) No. 5-32720 discloses an acrylic resin premix comprising (i) 20 to 60% by weight of an unsaturated monomer containing methyl methacrylate as a main component, (ii) 80 to 40% by weight of an inorganic powder, and (iii) 1 to 25% by weight of a resin fine particle which has a degree of swelling in methyl methacrylate of 3 to 15 times and is insoluble in methyl methacrylate.

Japanese Patent Application Laid-Open (JP-A) No. 7-188505 discloses an acrylic resin premix comprising, (i) based 100 parts by weight of an "acrylic syrup A" comprising as main components an unsaturated monomer essentially composed of methyl methacrylate and a polymer essentially composed of a polymer of methyl methacrylate, (ii) 180 to 260 parts by weight of an "inorganic powder B" and (iii) 60 to 140 parts by weight of a "resin particle C" containing an inorganic powder, wherein the resin particle C is insoluble in methyl methacrylate, and shows an oil absorption in methyl methacrylate after one day of 40 to 100% by weight and a degree of swelling in methyl methacrylate of 2 times or less.

However, in the method of Japanese Patent Application Publication (JP-B) No. 5-13899, the methacryl-based resin powder having an average molecular weight of 50,000 to 200,000 is used as a resin component and, therefore, there are problems regarding handling properties. Stickiness of the surface after the kneading and aging is remarkable, shape stability after the kneading is not sufficient and the kneaded resin flows or is deformed when only left.

Further, all of the premixes described in Japanese Patent Application Laid-Open (JP-A) No. 5-32720 and Japanese Patent Application Laid-Open (JP-A) No. 7-188505 contain the unsaturated monomer component essentially composed of methyl methacrylate, can not suppress evaporation of methyl methacrylate, are deficient in stability when stored or left, and further, have a bad odor. Therefore, improvement has been desired not only in view of handling properties but also in view of working environments.

SUMMARY AND OBJECTS OF THE INVENTION

The present inventor has intensively studied the issues regarding a resin composition suitable for producing artificial marble, which has excellent handling properties, generates little odor in handling and can be easily molded. As a result, it has been found that a resin composition comprising an unsaturated monomer having at least two double bonds which can effect radical polymerization or a mixture of said unsaturated monomer and an unsaturated monomer copolymerizable with said unsaturated monomer, an inorganic filler, a cross-linked resin particle, a resin having a methyl methacrylate unit, and a radical polymerization initiator, respectively in specific amounts, has excellent handling properties, generates little odor in handling, and can be easily molded for producing artificial marble. The present invention has been accomplished on the basis of the above findings.

Thus, the present invention provides a resin composition comprising the components of:

(a) 10 to 40% by weight of (i) an unsaturated monomer having at least two double bonds which can effect radical polymerization or (ii) a mixture of said unsaturated monomer and an unsaturated monomer copolymerizable with said unsaturated monomer, (b) 50 to 85% by weight of an inorganic filler, (c) 1 to 20% by weight of a cross-linked resin particle, (d) 0.1 to 20% by weight of a resin having a methyl methacrylate unit, and (e) 0.01 to 5% by weight of a radical polymerization initiator.

The present invention further provides artificial marble obtained by heating and curing the resin composition.

The present invention still further provides a method for producing artificial marble in which said resin composition is heated at a temperature of 30 to 80° C. to obtain a compound in the form of clay, then, said compound is subjected to thermal compression molding at 80 to 200° C.

DETAILED DESCRIPTION OF THE PREFERRED EMBODIMENT

A resin composition of the present invention comprises the components of:

(a) 10 to 40% by weight of (i) an unsaturated monomer having at least two double bonds which can effect radical polymerization or (ii) a mixture of said unsaturated monomer and an unsaturated monomer copolymerizable with said unsaturated monomer, (b) 50 to 85% by weight of an inorganic filler, (c) 1 to 20% by weight of a cross-linked resin particle, (d) 0.1 to 20% by weight of a resin having a methyl methacrylate unit, and (e) 0.01 to 5% by weight of a radical polymerization initiator.

In the present invention, Examples of the unsaturated monomer having at least two double bonds which can effect radical polymerization include allyl methacrylate, ethylene glycol di(meth)acrylate, diethylene glycol di(meth)acrylate, triethylene glycol di(meth)acrylate, polyethylene glycol di(meth)acrylate, polypropylene glycol di(meth)acrylate, 1,3-butylene glycol di(meth)acrylate, 1,6-hexane diol di(meth)acrylate, neopentyl glycol di(meth)acrylate, divinylbenzene, diallyl phthalate, trimethylolpropane tri(meth)acrylate, tetramethylolmethane tri(meth)acrylate, tetramethylolmethane tetra(meth)acrylate, and the like. Here, the term "(meth)acrylate" represents both acrylate and methacrylate. Among them, the unsaturated monomer having at least two methacryloxy groups is preferred since there remains only a little amount of unsaturated monomer which has not reacted in the curing reaction thereof.

In the present invention, An unsaturated monomer copolymerizable with the unsaturated monomer having at least two double bonds which can effect radical polymerization can be used with the latter unsaturated monomer and is not restricted as long as it has such copolymerizable property, and can be appropriately selected for use. Examples of the unsaturated monomer copolymerizable with the unsaturated monomer having at least two double bonds which can effect radical polymerization include esters of methacrylic acid or acrylic acid with aliphatic, aromatic, alicyclic alcohol such as methyl (meth)acrylate, ethyl (meth)acrylate, propyl (meth)acrylate, butyl (meth)acrylate, 2-ethylhexyl (meth)acrylate, lauryl (meth)acrylate, tetrahydrofurfuryl (meth)acrylate, isobornyl (meth)acrylate, benzyl (meth)acrylate and cyclohexyl (meth)acrylate; (meth)acryl-based monomers such as hydroxyalkyl esters such as hydroxyethyl (meth)acrylate, hydroxypropyl (meth)acrylate and hydroxybutyl (meth)acrylate; unsaturated acids such as acrylic acid and methacrylic acid; styrene-based monomers such as styrene and α-methylstyrene; unsaturated nitriles such as acrylonitrile and methacrylonitrile; monofunctional unsaturated monomers such as maleic anhydride, phenylmaleimide, cyclohexylmaleimide and vinyl acetate. Among them, esters of methacrylic acid are preferred.

In the present invention, a mixture of an unsaturated monomer having at least two double bonds which can effect radical polymerization and an unsaturated monomer copolymerizable with the said unsaturated monomer preferably comprises 50% by weight or more of an unsaturated monomer having at least two double bonds which can effect radical polymerization based on the mixture. The content of the unsaturated monomer having at least two double bonds which can effect radical polymerization in the mixture is more preferably from 55 to 99.9% based on the mixture.

The unsaturated monomer having at least two double bonds which can effect radical polymerization, and the unsaturated monomer copolymerizable with the said unsaturated monomer can also be used in admixture of two or more, respectively.

The unsaturated monomer having at least two double bonds which can effect radical polymerization and/or the unsaturated monomer copolymerizable with the said unsaturated monomer can be used with dissolving a resin having a methyl methyl methacrylate unit of the present invention.

Hereinafter, these both unsaturated monomers are referred to as "unsaturated monomers" unless otherwise stated.

A content of unsaturated monomers in the resin composition of the present invention is in the range from 10 to 40% by weight based on the resin composition.

When the content is less than 10% by weight, sufficient moldability is not obtained in molding the resin composition, and on the other hand, when the content is over 40% by weight, stickiness of the surface is remarkable and it is difficult to keep the form after kneading and, therefore, handling in both cases is not good, undesirably.

The inorganic filler in the present invention is not particularly restricted provided it is insoluble in the unsaturated monomers and does not disturb the polymerization reaction thereof.

Examples of an inorganic filler include, but are not limited to, an inorganic particle such as a particle comprising aluminum hydroxide, aluminum oxide, calcium carbonate, calcium silicate, calcium sulfate, magnesium hydroxide, silica, talc, clay or bentonite, and a glass fiber such as a fiber comprising alkali glass or non-alkali glass. Two or more kinds of inorganic fillers can be used at the same time. A particle comprising aluminum hydroxide and a mixture of the particle and a glass fiber are preferably used as the inorganic filler.

When the inorganic particle is used as the inorganic filler, the particle comprising aluminum hydroxide, magnesium hydroxide or silica is preferable in view of appearance and physical properties of artificial marble to be obtained.

The particle size of the inorganic particle is preferably in the range of 5 to 100 $\mu$m. When the particle size is less than 5 $\mu$m, a viscosity of the resin composition in mixing or molding tends to become extremely high, undesirably. On the other hand, when the particle size is over 100 $\mu$m, physical properties such as strength of the artificial marble to be obtained may undesirably deteriorate. However, when it is intended to impart design to the artificial marble to be obtained, an inorganic particle having a particle size of over 100 $\mu$m can be used in the resin composition.

The content of the inorganic filler in the resin composition of the present invention is in the range from 50 to 85% by weight based on the resin composition. When the content is less than 50% by weight, marble-like appearance and texture can not be obtained in artificial marble to be obtained, and when the content is over 85% by weight, it is difficult to disperse the filler uniformly in the resin component in mixing, undesirably.

A cross-linked resin particle is used in the resin composition of the present composition, and examples thereof include resin particles obtained by polymerization such as emulsion polymerization, suspension polymerization and dispersion polymerization, and resin particles obtained by grinding a cross-linked resin polymer, which is obtained by other polymerization, into pieces The cross-linked resin particle of the present composition swells and is not completely dissolved in the solvent in which polymethylmethacrylate can be dissolved, such as acetone. A cross-linked resin particle which is made of methylmethacrylate in an amount of about 50% by weight or more based on the resin particle is preferably used.

The cross-linked resin particle can be obtained, for example, by adding an unsaturated monomer having at least two double bonds which can effect radical polymerization when a mixture of about 50% by weight or more of methylmethacrylate and an unsaturated monomer copolymerization with methylmethacrylate is polymerized to obtain a resin particle thereof or a polymer thereof.

An average particle size of the cross-linked resin particle is usually in the range of 1 to 100 μm. When a cross-linked resin particle having a particle size over 100 μm is used, the form of the particle is noticeable after molding. However, when it is intended to impart design such as grain-like appearance to the artificial marble to be obtained, the size of the particle is not particularly restricted.

An amount of the cross-linked resin particle is from 1 to 20% by weight based on the resin composition. When the amount is less than 1% by weight, the stickiness of the composition is remarkable, and the handling property deteriorates. On the other hand, when the amount is over 20% by weight, the form-keeping ability of the composition decreases, and the handling property deteriorates.

A resin having a methyl methacrylate unit is used in the resin composition of the present composition, and the resin having a methyl methacrylate unit represents a homopolymer of methyl methacrylate or a copolymer comprising a methyl methacrylate monomer and an unsaturated monomer copolymerizable with methyl methacrylate.

Examples of the unsaturated monomer copolymerizable with methyl methacrylate include, but are not limited to, esters of methacrylic acid or acrylic acid with aliphatic, aromatic, alicyclic alcohol, such as methyl (meth)acrylate, ethyl (meth)acrylate, propyl (meth)acrylate, butyl (meth)acrylate, 2-ethylhexyl (meth)acrylate, lauryl (meth)acrylate, tetrahydrofurfuryl (meth)acrylate, isobornyl (meth)acrylate, benzyl (meth)acrylate and cyclohexyl (meth)acrylate; (meth)acryl-based monomers such as hydroxyalkyl esters such as hydroxyethyl (meth)acrylate, hydroxypropyl (meth)acrylate and hydroxybutyl (meth)acrylate; unsaturated acids such as acrylic acid and methacrylic acid; styrene-based monomers such as styrene and α-methylstyrene; unsaturated nitriles such as acrylonitrile and methacrylonitrile; monofunctional unsaturated monomers such as maleic anhydride, phenylmaleimide, cyclohexylmaleimide and vinyl acetate; polyfunctional unsaturated monomers having a plurality of double bonds which can effect radical polymerization, such as allyl methacrylates, ethylene glycol di(meth)acrylate, diethylene glycol di(meth)acrylate, triethylene glycol di(meth)acrylate, polyethylene glycol di(meth)acrylate, polypropylene glycol di(meth)acrylate, 1,3-butylene glycol di(meth)acrylate, 1,6-hexane diol di(meth)acrylate, neopentyl glycol di(meth)acrylate, divinylbenzene, trimethylolpropane tri(meth)acrylate, tetramethylolmethane tri(meth)acrylate and tetramethylolmethane tetra(meth)acrylate.

The content of the resin having a methyl methacrylate unit in the resin composition of the present invention falls in the range from 0.1 to 20% by weight based on the resin composition. When the content is less than 0.1% by weight, the form keeping ability of the composition is weak, and the handling property deteriorates. On the other hand, when the content is over 20% by weight, the viscosity in mixing the resin composition remarkably rises, and the mixing becomes difficult.

A radical polymerization initiator is used in the resin composition of the present composition, and it effects polymerization and curing of the unsaturated monomer.

Examples of the radical polymerization initiator include azo compounds such as 1,1'-azobis(cyclohexane-1-carbonitrile), 2,2'-azobis(2,4,4-trimethylpentene), 2,2'-azobis(2-methylpropane), 2-cyano-2-propylazoformamide, 2,2'-azobis(2-hydroxymethylpropionate), 2,2'-azobis(2-methyl-butylonitrile), 2,2'-azobisisobutylonitrile, 2,2'-azobis[2-(2-imidazoline-2-yl)propane] and dimethyl-2,2'-azobis(2-methylpropionate); diacyl and/or dialkyl peroxide-based initiators such as dicumyl peroxide, t-butylcumyl peroxide, di-t-butyl peroxide, benzoyl peroxide and lauroyl peroxide; peroxy ester-based initiators such as t-butyl peroxy-3,3,5-trimethyl hexanoate, t-butyl peroxyl laurate, t-butyl peroxy isobutyrate, t-butyl peroxy acetate, di-t-butyl peroxyhexahydro terephthalate, di-t-butyl peroxy azelate, t-butyl peroxy-2-ethyl hexanoate, 1,1,3,3-tetramethylbutyl peroxy-2-ethyl hexanoate and t-amyl peroxy-2-ethyl hexanoate; percarbonate-based initiators such as t-butyl peroxy allyl carbonate and t-butyl peroxyisopropyl carbonate; peroxy ketal-based initiators such as 1,1-di-t-butyl peroxycyclohexane, 1,1-di-t-butyl peroxy-3,3,5-trimethylcyclohexane and 1,1-di-t-hexyl peroxy-3,3,5-trimethylcyclohexane.

The content of the polymerization initiator in the resin composition of the present invention falls in the range from 0.01 to 5% by weight based on the resin composition. When the content is less than 0.01 part by weight, the radical polymerization requires long period of time, and when the content is over 5 parts by weight, the unsaturated monomer can not be polymerized steadily.

In the present invention, a polymerization initiator having a decomposition temperature such that a 10-hour half-life temperature is in the range of 60 to 100° C. is preferred. When the temperature is lower than 60° C., it may cause the radical polymerization in mixing the resin composition, or in storage or transportation of the mixed and aged resin composition which is so-called compound, undesirably.

The radical polymerization initiator can be used in combination of two or more.

It is preferable that the resin composition of the present invention contains a surfactant having elemental phosphorus. By containing the surfactant having elemental phosphorus, uniformity in mixing the resin composition is improved.

In particular, the surfactant is effective when inorganic fillers are contained in large amount.

Examples of the surfactant having elemental phosphorus include a phosphate monoester represented by the following formula (1):

$$RO(CH_2CH_2O)_nP(O)(OH)_2 \qquad (1)$$

and a phosphate diester represented by the following formula (2):

$$[RO(CH_2CH_2O)_n]_2P(O)OH \qquad (2).$$

In the formula (1) and formula (2), each R represents an alkyl group or alkylphenol having 8 to 30 carbon atoms, and each n is an average mole number of ethylene oxide added and represents 1 to 10.

The surfactant having elemental phosphorus is used in an amount of 0.01 to 5% by weight based on the resin composition of the present invention. When the amount is less than 0.01 part by weight, viscosity in mixing is high, and on the other hand, when the amount is over 5 parts by weight, properties of the resin composition such as resistance against water may be deteriorate.

The resin composition of the present invention can further contain a releasing agent, an ultraviolet ray absorbing agent, a dye, a pigment, a polymerization inhibitor, a chain transfer agent, an antioxidant, a flame retardant, a coupling agent, a reinforcing agent and the like.

The resin composition is obtained in the form of slurry or gluten by mixing the above-mentioned unsaturated monomer, inorganic filler, cross-linked resin particle, resin having a methyl methacrylate unit, radical polymerization initiator, and optionally, surfactant having elemental phosphorus and the like.

In the mixing, it is preferable in view of uniformity of the resin composition that the resin having a methyl methacrylate unit is previously dissolved in the unsaturated monomer, then, is mixed, however, it is also possible that the mixing is conducted in the condition in which the resin is suspended in the unsaturated monomer, or the whole components are appropriately mixed.

In the following, a method for producing artificial marble by molding the resin composition of the present invention is described.

The method for producing artificial marble comprises steps of (i) mixing and aging the resin composition of the present invention, and (ii) polymerizing and curing the resulting composition.

In the step of the mixing and aging of the resin composition, the above-mentioned unsaturated monomer, inorganic filler, cross-linked resin particle, resin having a methyl methacrylate unit, radical polymerization initiator, and optionally, surfactants having elemental phosphorus and the like are mixed to obtain an uniform resin composition, finally. Examples of the step include a step such that the above-mentioned unsaturated monomer, inorganic filler, cross-linked resin particle, resin having a methyl methacrylate unit, radical polymerization initiator, and optionally, surfactant having elemental phosphorus and the like are mixed to obtain a slurry of the resin composition, then the slurry is aged in an appropriate vessel. The vessel is not particularly restricted and a material thereof is not particularly restricted provided it is not dissolved in or is not corroded by the above-described unsaturated monomer.

When the resin composition after mixing is in the form of slurry, it is possible to use as a vessel, in which the resin composition is enclosed, a cell composed of at least two flat plates facing each other and a seal material sealing the surroundings. The material of the flat plate is not particularly restricted provided it is not dissolved in or is corroded by the above-described unsaturated monomer. Usually, a glass plate, metal plate and the like are used. In the case of a metal plate, a continuous plate in the form of a belt can be used. Further, it is also possible that a releasing film is previously laid on the inner surface of the cell or an inner bag is inserted in the cell.

When the resin composition after mixing is in the form of gluten and has high viscosity, the resin may be wrapped by a film or inserted in a bag, or enclosed in a vessel equipped with a lid and the like. For mixing of the resin composition having high viscosity, a known mixing apparatus such as a kneader and the like may be advantageously used. When the resin composition is enclosed in the vessel and the like, a treatment such as de-foaming under reduced pressure and the like may be conducted.

The resin composition mixed may be enclosed in a vessel and the like, and heated at 30 to 80° C. for aging. During the aging, the unsaturated monomer may be impregnated into the cross-linked resin particle added and the resin having a methyl methacrylate unit may be dissolved in the unsaturated monomer. An appearance of the resin composition changes from slurry form to clay form during the aging, and the resin composition after the aging, which is a soft material, can be used as a material to be molded.

When the mixed resin composition is heated over 80° C., polymerization and/or curing reaction may initiate undesirably due to the radical polymerization initiator added. When the mixed resin composition is aged at a temperature lower than 30° C., the aging requires long period of time, undesirably. Therefore, the aging temperature is desirably in the range from 30 to 80° C.

The aging conditions are selected depending on the composition of the resin composition, especially on the kind of the cross-linked particle used, the composition of the unsaturated monomer and the like, provided the unsaturated monomer may be impregnated into the cross-linked resin particle added. The higher the temperature is, the shorter the period of time to be needed becomes for the aging. The period of time to be needed for the aging depends on the resin composition, especially on the kind of the cross-linked particle used, the composition of the unsaturated monomer and the like and is usually in the range of about 1 to 50 hours. A completion of the aging can be recognized by, for example, a measurement of hardness of the mixed and aged resin composition. After completion of the aging, so-called compound can be obtained from the resin composition in the form of clay.

When a mixing apparatus in which the resin composition is mixed has a temperature control function, the mixing and the heating of the resin composition can be conducted at the same time to carry out the mixing and the aging of the resin composition, more easily. At that time, a known kneading apparatus such as 2-axis extruder, an almighty mixing apparatus, kneader and banbury mixer can be used as a kneading apparatus.

After the mixing and aging steps, polymerizing and curing steps are conducted. In the polymerizing and curing steps, the above-mentioned clay-form compound to be molded may be thrown into a mold of various shapes, pressed, heated, shaped and cured to obtain molded articles of various forms.

Any method of molding can be used as long as the compound is pressed, heated, shaped and cured to obtain molded articles of various forms. Examples thereof include press molding, injection molding, transfer molding and the like.

When press molding is carried out, a press molding apparatus comprising a pressure-applying unit and a mold may be used. Temperature of a mold in press molding is controlled to be in the range of 80 to 200° C. Temperature of a side of mold surface facing to the compound can be the same as that of a side of mold surface opposite the former side, or there can be a difference between these temperature provided the difference is less than about 20° C.

A mold compression pressure is usually in the range of about 20 to 130 kg/cm$^2$. When the pressure is lower than 20 kg/cm$^2$, disadvantages such as tanishing tend to be caused on the surface of the moldings, undesirably. On the other hand, when the pressure is over 130 kg/cm$^2$, the compound may flow out of the mold, undesirably.

The molding conditions such as the temperature of the mold, the mold compression pressure, a rate of a mold compression and a place at which the compound is added into the mold are selected depending on a shape of the moldings and a period to be needed of time for producing the resulted artificial marble.

When injection molding or transfer molding is carried out, a injection molding apparatus or a transfer molding apparatus comprising a injection unit and a mold compression unit is used.

A suitable screw used for a measurement or a injection has a pressure ratio of 1.5 or less. The screw may have a back-flow-preventing valve, which has a various structure, at the top.

Temperature of a cylinder covering a screw and of a pipe for transfer of transfer molding is preferably controlled to be 60° C. or less. When the temperature is over 60° C., a local-temperature increase may take place due to shearing heat generation between the screw and the cylinder or in the pipe during transfer, and curing reaction may initiate, undesirably.

When injection molding or transfer molding is carried out, temperature of a mold is controlled to be in the range of 80 to 200° C. Temperature of a surface of one mold can be the same as that of the other mold in a pair of molds, or there can be a difference between these temperature provided the difference is less than about 20° C.

A mold compression pressure and a clearance between molds may be controlled constantly, or may be controlled continuously or gradually depending on the progress of the curing reaction.

The molding conditions of injection molding and transfer molding are selected depending on a shape of the moldings and a period to be needed of time for producing the resulted artificial marble.

As described above, for molding and curing reaction in the present invention, a reaction temperature of from 80 to 200° C. is preferable. When the temperature is lower than 80° C., the curing reaction requires long period of time and is industrially disadvantageous. On the other hand, when the temperature is over 200° C., decomposition and coloration may occur or an advantageous moldings tend not to be obtained, undesirably.

A period of time for molding and curing reaction in the present invention is usually in the range of about 1 to 20 minutes, and the period of time is effected with a kind and an amount of the radical polymerization initiator used, a kind and an amount of the unsaturated monomer, a thickness of moldings and a temperature of the surface of the mold. Generally, the thiner the moldings is and the higher the temperature of the mold is, the shorter the period of time for molding and curing reaction becomes to be needed.

The resin composition of the present invention has excellent handling property, generates little odor, and can be easily molded to obtain artificial marble.

EXAMPLE

The following examples further illustrate the present invention in detail but do not limit the scope thereof.

The evaluations are as follows:
(1) Handling property of compound:
Hardness after aging was measured by a rubber hardness tester and evaluated, according to the Japanese Standards Association JIS-K6301 method.
(2) Odor:
A compound of 50×50×3 mm was left under environment of 40° C., and reduction in weight of the compound for the first one hour, namely, volatilizing rate was measured and evaluated. Numerically, the rate was expressed as gram per square centimeters per hour ($g/cm^2/hr$).

Example 1

Into a 500 ml round-bottom flask were charged 8.2 parts by weight of syrup prepared by dissolving 30 parts by weight of polymethyl methacrylate (SUMIPEX MH, manufactured by Sumitomo Chemical Co., Ltd.) into 70 parts by weight of methyl methacrylate, 21.8 parts by weight of neopentyl glycol dimethacrylate (NK ester NPG, manufactured by SHIN-NAKAMURA CHEMICAL CO., LTD.), 7.8 parts by weight of a particle obtained by a method described in Japanese Patent Application Laid-Open (JP-A) No. Hei 5-155907, example 4 as a cross-linked particle, 60 parts by weight of aluminum hydroxide (CW-325, manufactured by Sumitomo Chemical Co., Ltd.), 1.5 parts by weight of glass fiber (RES03-BM31, manufactured by Nippon Sheet Glass Co., Ltd.) and 0.15 parts by weight of a polymerization initiator (KAYACARBON BIC-75, manufactured by Kayaku AKZO Corp.), and the resulted mixture was stirred and mixed to obtain a resin composition in the form of slurry.

This resin composition was poured into a cell comprising glass plates (thickness: 5 mm) carrying on inner surface thereof a polyethylene film pasted and a gasket made of vinyl chloride resin inserted between the glass plates so that the clearance between them was 3 mm, and left in a hot air dryer at 60° C. for 5 hours for aging. The composition was cooled down to room temperature, then, the glass plates were removed to obtain a compound in the form of clay.

This compound had a rubber hardness of 25, and revealed a volatilizing (reduction in weight) rate of 0.0012 $g/cm^2/hr$.

Then, 120 g of the compound was thrown into a plate-form mold of 120×120×20 mm, and subjected to thermal compression molding for 30 minutes under conditions of a temperature of 120° C. and a mold compression pressure of 70 $kg/cm^2$.

The appearance after the molding was excellent without cracking.

Example 2

Into a 1 liter round-bottom flask were charged 13.3 parts by weight of neopentyl glycol dimethacrylate (NK ester NPG, manufactured by SHIN-NAKAMURA CHEMICAL CO., LTD.), 3 parts by weight of methyl methacrylate, 6 parts by weight of a particle obtained by a method described in Japanese Patent Application Laid-Open (JP-A) No. Hei 5-155907, example 4 as a cross-linked particle, 6 parts by weight of polymethyl methacrylate (SUMIPEX MH, manufactured by Sumitomo Chemical Co., Ltd.), 70 parts by weight of aluminum hydroxide (CW-325, manufactured by Sumitomo Chemical Co., Ltd.), 1.5 parts by weight of glass fiber (RES03-BM31, manufactured by Nippon Sheet Glass Co., Ltd.), 0.12 parts by weight of a polymerization initiator (KAYACARBON BIC-75, manufactured by Kayaku AKZO Corp.) and 0.3 parts by weight of a surfactant (PHOSPHANOL RS-710, manufactured by Toho Chemical Industry Co., Ltd.), and the resulted mixture was stirred and mixed to obtain a resin composition in the form of slurry.

This resin composition was poured into a cell comprising glass plates (thickness: 5 mm) carrying on inner surface thereof a polyethylene film pasted and a gasket made of vinyl chloride resin inserted between the glass plates so that the clearance between them was 3 mm, and left in a hot air dryer at 60° C. for 5 hours for aging. The composition was cooled down to room temperature, then, the glass plates were removed to obtain a compound in the form of clay.

This compound had a rubber hardness of 33, and revealed a volatilizing (reduction in weight) rate of 0.0006 $g/cm^2/hr$.

In this example, the resin composition in the form of slurry could be easily poured into the cell as compared with the resin composition in Example 1.

Then, the thermal compression molding was conducted in the same manner as in Example 1 using this compound, to produce artificial marble.

The appearance after the molding was excellent without cracking.

Example 3

The same procedure as in Example 2 was conducted except that 13.3 parts by weight of diethylene glycol dimethacrylate (NK ester NPG, manufactured by SHIN-NAKAMURA CHEMICAL CO., LTD.) was used instead of neopentyl glycol dimethacrylate, to obtain a compound in the form of clay.

This compound had a rubber hardness of 28, and revealed a volatilizing (reduction in weight) rate of 0.0008 $g/cm^2/hr$.

Then, the thermal compression molding was conducted in the same manner as in Example 1 using this compound, to produce artificial marble.

The appearance after the molding was excellent without cracking.

Example 4

In a laboratory mill manufactured by Toyo Seiki Co. Ltd., 10.6 parts by weight of neopentyl glycol dimethyacrylate (NK ester NPG, manufactured by SHIN-NAKAMURA CHEMICAL CO., LTD.), 4 parts by weight of methyl methacrylate, 11 parts by weight of a particle obtained by a method described in Japanese Patent Application Laid-Open (JP-A) No. Hei 5-155907, example 4 as a cross-linked particle, 6.3 parts by weight of a copolymer of methyl methacrylate and styrene (10:90), 60 parts by weight of aluminum hydroxide (CW-325, manufactured by Sumitomo Chemical Co., Ltd.), 7.9 parts by weight of glass fiber (RES03-BM31, manufactured by Nippon Sheet Glass Co., Ltd.), 0.36 parts by weight of a polymerization initiator (KAYACARBON BIC-75, manufactured by Kayaku AKZO Corp.) and 0.24 parts by weight of a surfactant (PHOSPHANOL RS-710, manufactured by Toho Chemical Industry Co., Ltd.) were mixed, to obtain a resin composition in the form of gluten.

This resin composition was enclosed in a bag made of polyethylene, and de-foamed under 80 mm Hg for 3 minutes. Further, the aperture of this bag was sealed and left in a hot air dryer at 60° C. for 7 hours for aging. The composition was cooled down to room temperature, then, a compound in the form of clay was obtained.

This compound had a rubber hardness of 33, and revealed a volatilizing (reduction in weight) rate of 0.0022 $g/cm^2/hr$.

Then, the thermal compression molding was conducted in the same manner as in Example 1 using this compound, to produce artificial marble.

The appearance after the molding was excellent without cracking.

Comparative Example 1

The stirring and mixing were conducted in the same manner as in Example 2 except that 13.3 parts by weight of methyl methacrylate was used instead of neopentyl glycol dimethacrylate. Flowability was lost during the stirring, and uniform mixing became impossible. The resulted mixture could not poured into the cell.

This resin composition was sandwiched between glass plates (thickness: 5 mm) carrying on inner surface thereof a polyethylene film pasted, and the surroundings thereof were sealed by a gasket made of a vinyl chloride resin. It was further left in a hot air dryer at 60° C. for 5 hours for aging. The composition was cooled down to room temperature, then, the glass plates were removed to obtain a compound.

This compound had a rubber hardness of 15, revealed a volatilizing (reduction in weight) rate of 0.012 $g/cm^2/hr$ and generated odor of methyl methacrylate.

Then, the thermal compression molding was conducted in the same manner as in Example 1. When the mold was opened, a lot of cracks were observed on the resulted molded article.

What is claimed is:

1. A resin composition comprising the components of:
   (a) 10 to 40% by weight of (i) an unsaturated monomer having at least two double bonds which can effect radical polymerization or (ii) a mixture of said unsaturated monomer and an unsaturated monomer copolymerizable with said unsaturated monomer,
   (b) 50 to 85% by weight of an inorganic filler,
   (c) 1 to 20% by weight of a cross-linked resin particle,
   (d) 0.1 to 20% by weight of a resin having a methyl methacrylate unit, and
   (e) 0.01 to 5% by weight of a radical polymerization initiator.

2. A resin composition further comprising (f) a surfactant having elemental phosphorus in addition to the components (a) to (e) in claim 1.

3. The resin composition according to claim 1 or claim 2, wherein the unsaturated monomer having at least two double bonds which can effect radical polymerization is an unsaturated monomer having at least two methacryloxy groups.

4. The resin composition according to claim 1 or claim 2, wherein the unsaturated monomer having at least two double bonds which can effect radical polymerization is neopentyl glycol dimethyacrylate.

5. The resin composition according to claim 1 or claim 2, wherein the unsaturated monomer having at least two double bonds which can effect radical polymerization is an ester of methacrylic acid.

6. The resin composition according to claim 1 or claim 2, wherein the inorganic filler comprises aluminum hydroxide.

7. The resin composition according to claim 1 or claim 2, wherein the inorganic filler comprises a mixture of particles comprising aluminum hydroxide and a glass fiber.

8. The resin composition according to claim 1 or claim 2, wherein the cross-linked resin particle has an average particle size of 1 to 100 $\mu$m.

9. The resin composition according to claim 1 or claim 2, wherein the cross-linked resin particle is made of methylmethacrylate in an amount of about 50% by weight or more based on the resin particle.

10. The resin composition according to claim 1 or claim 2, wherein the polymerization initiator has a 10-hour half-life temperature of 60 to 100° C.

11. The resin composition according to claim 1 or claim 2, wherein the unsaturated monomer having at least two double bonds which can effect radical polymerization is an unsaturated monomer having at least two methacryloxy groups, the unsaturated monomer having at least two double bonds which can effect radical polymerization is an ester of methacrylic acid, the inorganic filler is a mixture of a particle comprising aluminum hydroxide and a glass fiber, the cross-linked resin particle has an average particle size of 1 to 100 $\mu$m, the cross-linked resin particle comprises about 50% by weight or more of methylmethacrylate based on the resin particle and the polymerization initiator has a 10-hour half-life temperature of 60 to 100° C.

12. Artificial marble obtained by heating and curing the resin composition of claim 1 or claim 2.

13. A method for producing artificial marble comprising the steps of (i) mixing and aging the resin composition of claim 1 or claim 2, and (ii) polymerizing and curing the resulting composition.

14. A method for producing artificial marble in which the resin composition of claim 1 or claim 2 is heated at a temperature of 30 to 80° C. to obtain a compound in the form of clay, and then said compound is subjected to thermal compression molding at 80 to 200° C.

15. A method for producing artificial marble comprising the steps of (i) mixing and aging the resin composition of claim 11, and (ii) polymerizing and curing the resulting composition.

16. A method for producing artificial marble in which the resin composition of claim 11 is heated at a temperature of 30 to 80° C. to obtain a compound in the form of clay, and then said compound is subjected to thermal compression molding at 80 to 200° C.

* * * * *